United States Patent [19]

Onuki

[11] 4,413,176
[45] Nov. 1, 1983

[54] PORTABLE TAPE READER

[75] Inventor: Tadayoshi Onuki, Sagamihara, Japan

[73] Assignee: Fujitsu Fanuc Limited, Tokyo, Japan

[21] Appl. No.: 355,722

[22] PCT Filed: Jul. 10, 1980

[86] PCT No.: PCT/JP81/00160
§ 371 Date: Mar. 3, 1982
§ 102(e) Date: Mar. 3, 1982

[87] PCT Pub. No.: WO82/00375
PCT Pub. Date: Feb. 4, 1982

[30] Foreign Application Priority Data

Jul. 10, 1980 [JP] Japan .................. 55-96182[U]

[51] Int. Cl.³ .............................................. G06K 7/04
[52] U.S. Cl. .................................. 235/445; 235/442;
235/433; 178/42
[58] Field of Search .............. 235/442, 445, 433, 449;
178/34, 42, 111, 112

[56] References Cited

U.S. PATENT DOCUMENTS 2,956,270 10/1960 Wallens et al. ..................... 178/42

FOREIGN PATENT DOCUMENTS 53-29062 7/1978 Japan .
56-82990 7/1981 Japan ................................. 235/442

Primary Examiner—G. Z. Rubinson
Attorney, Agent, or Firm—Armstrong, Nikaido, Marmelstein & Kubovcik

[57] ABSTRACT

Disclosed is a portable tape reader characterized in that a lid provided with a handle is integrally formed on the upper portion of a body provided with a reading head, the body is contained in a container box so that the body can be drawn out upwardly, and when the body is drawn out, the container box is held in the lower portion of the body and an opening of the container box is located below the reading head. In the portable tape reader having the above-mentioned structure, a tape which has been read is securely received and stored in the container box.

3 Claims, 3 Drawing Figures

PORTABLE TAPE READER

TECHNICAL FIELD

The present invention relates to a portable tape reader, more particularly, to an improvement in a mechanism for storing tape which has been read in the portable tape reader.

BACKGROUND ART

In a digital control device or the like, tape on which control information is punched is read by a tape reader. This information is stored in an internal memory and is used for the operation of various control mechanisms. In case of a digital control device not provided with a tape reader, when the control device is actually used, a portable tape reader is attached to the digital control device and connected to an internal memory for read-out of punched informations. When such a portable tape reader is used, the read tape is randomly fed out on the floor in front of the control device. If an operator steps on or damages the tape by mistake, it sometimes happens that reproduction of the information from the tape becomes impossible.

DISCLOSURE OF THE INVENTION

The present invention is meant to eliminate the foregoing disadvantage. It is therefore a primary object of the present invention to provide a portable tape reader in which a punched tape which has been read is securely stored in a container box without being fed out on the floor. In accordance with the present invention, this object can be attained by a tape reader characterized in that a lid provided with a handle is integrally formed on the upper portion of a body provided with a reading head, the body is contained in a container box so that the body can be drawn out upwardly, and when the body is drawn out, the container box is held in the lower portion of the body and an opening of the container box is located below said reading head.

In a portable tape reader having the above-mentioned structure, since the container box is held in the lower portion of the body when the body is drawn out and the opening of the container box is located below the reading head, all the read tape can be stored in this container box and is prevented from being fed out on the floor.

BEST MODE FOR CARRYING OUT THE INVENTION

Figure 1:
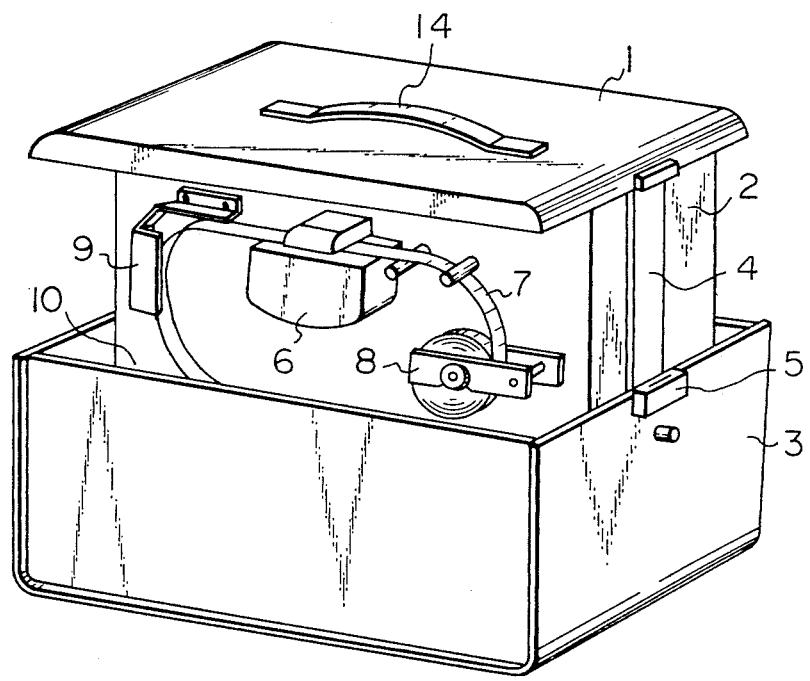
FIG. 1 is a perspective view of the portable tape reader of the present invention seen from the front face.
Figure 2:
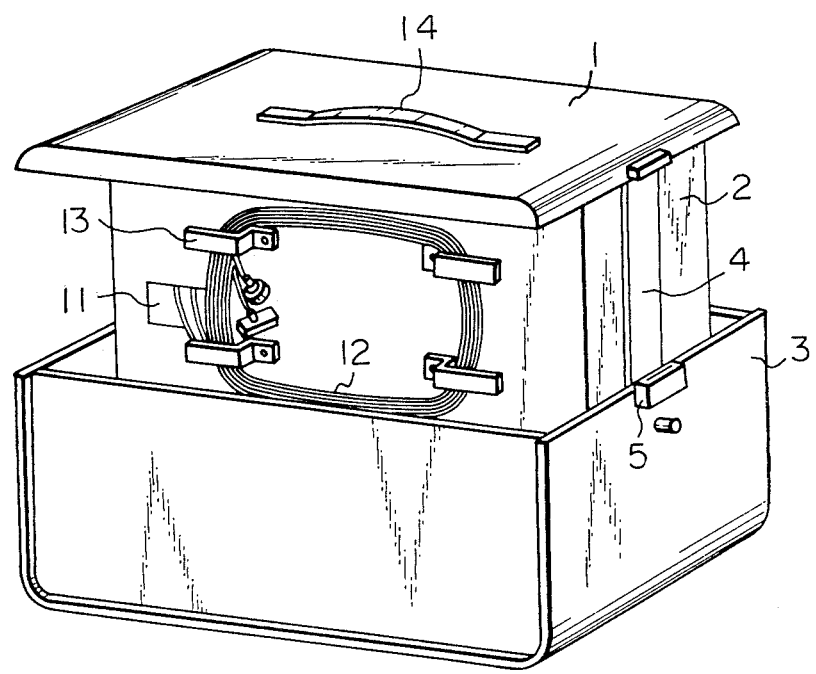
FIG. 2 is a perspective view of the portable tape reader of FIG. 1 seen from the back face.
Figure 3:
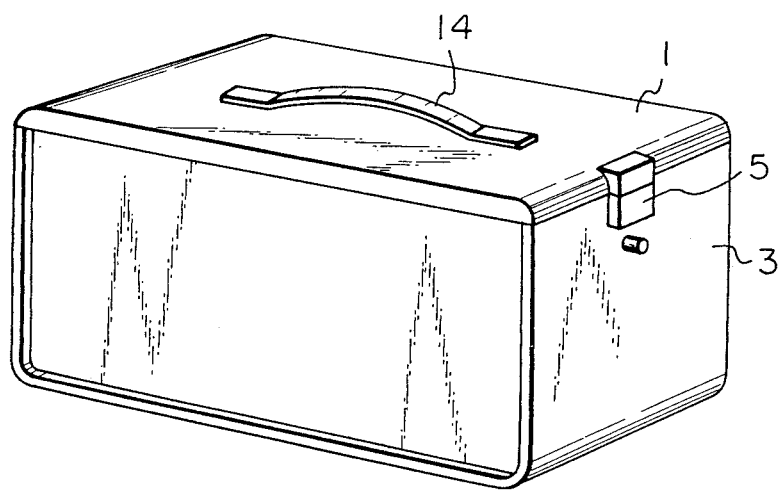
FIG. 3 is a perspective view of FIG. 1 in the state where the portable tape reader is not used.

FIG. 1 is a perspective view of the portable tape reader of the present invention in the state of actual use. A tape holder 8, for attachment of a tape reading head 6 and a tape 7, and a tape guide 9 are arranged on the front face of a body 2. A lid 1 having a handle 14 is integrally formed on the upper portion of the body 2. Slide rails 4 are laid out on both the side faces of the body 2, so that the body 2 can slide in the vertical direction along the guide rails 4 in a container box 3. A stopper member 5 is disposed to couple the lid 1 with the container box 3 in the state where the body 2 is contained and stored in the container box 3 (see FIG. 3). In the state where the body 2 is drawn out (see FIG. 1), the container box 3 is secured by an appropriate stopper (not shown) in such a manner that the container box 3 hangs down in the lower portion of the body 2. In this state, an opening 10 of the container box 3 is located below the front face of the body 2. On the back face of the body 2, a cable 12 is taken out from a take-out opening 11 as shown in FIG. 2. This cable 12 is held by four cable holders 13. The portable tape reader having the above-mentioned structure is attached to the front face of a digital control device (not shown) and is electrically connected to the digital control device through the cable 12.

In the portable tape reader having the above-mentioned structure, when the body 2 is drawn out, the container box 3 is secured and held in the lower portion of the body, and the opening 10 of the container box 3 is located below the head 6. Accordingly, all the read tape 7 is contained and stored in the container box 3 and is prevented from being randomly fed out on the floor.

INDUSTRIAL APPLICABILITY

The present invention can be applied to various processing machines, manufacturing apparatuses, and other digital control devices where digital control is performed by using punched tapes.

I claim:

1. A portable tape reader characterized in that a lid provided with a handle is integrally formed on the upper portion of a body provided with a reading head, the body is contained in a container box so that the body can be drawn out upwardly, and when the body is drawn out, the container box is held in the lower portion of the body and an opening of the container box is located below said reading head.

2. A portable tape reader as set forth in claim 1, wherein the tape reading head is arranged on the front face of the body and slide rails for moving the container box in the vertical direction are formed on both the side faces of the body.

3. A portable tape reader as set forth in claim 2, wherein in the state where the body is contained in the container box, the body is completely surrounded by the container box and the lid formed on the upper portion of the body, and in the state where the body is drawn out, a head-containing space in the front portion of the container box is opened below the reading head arranged on the front face of the body.

* * * * *

UNITED STATES PATENT AND TRADEMARK OFFICE
CERTIFICATE OF CORRECTION

PATENT NO. :   4,413,176
DATED      :   November 1, 1983
INVENTOR(S) :  TADAYOSHI ONUKU It is certified that error appears in the above-identified patent and that said Letters Patent is hereby corrected as shown below:

On the cover page, Item [22], change "Jul. 10, 1980" to --- Jul. 10, 1981 ---.

Signed and Sealed this

Fifteenth Day of September, 1987

Attest:

DONALD J. QUIGG

*Attesting Officer*   *Commissioner of Patents and Trademarks*